(12) United States Patent
Mos

(10) Patent No.: US 9,316,471 B1
(45) Date of Patent: Apr. 19, 2016

(54) SYSTEM AND METHOD FOR ATTACHING A POSITION MARKER TO A TOOL

(71) Applicant: Mihai Mos, Lawrenceville, NJ (US)

(72) Inventor: Mihai Mos, Lawrenceville, NJ (US)

( * ) Notice: Subject to any disclaimer, the term of this patent is extended or adjusted under 35 U.S.C. 154(b) by 81 days.

(21) Appl. No.: 14/484,260

(22) Filed: Sep. 12, 2014

Related U.S. Application Data

(60) Provisional application No. 61/960,213, filed on Sep. 12, 2013, provisional application No. 61/961,776, filed on Oct. 23, 2013.

(51) Int. Cl.
*G01B 3/10* (2006.01)
*B25H 7/04* (2006.01)
*G01C 9/02* (2006.01)

(52) U.S. Cl.
CPC ............... *G01B 3/1084* (2013.01); *G01C 9/02* (2013.01); *G01B 2003/1089* (2013.01)

(58) Field of Classification Search
CPC ............... G01B 3/1071; G01B 3/1084; G01B 2003/1089; G01C 9/02
USPC ............... 33/666, 668, 760, 761, 769, 770
See application file for complete search history.

(56) References Cited

U.S. PATENT DOCUMENTS

| | | | | |
|---|---|---|---|---|
| 3,148,455 A * | 9/1964 | Aciego | ............... | B25H 7/04 33/668 |
| 3,802,083 A * | 4/1974 | Freed | ............... | B25H 7/04 33/668 |
| 4,015,337 A | 4/1977 | Taylor | | |
| 4,296,554 A | 10/1981 | Hammerstrom | | |
| 4,580,347 A * | 4/1986 | McKnight | ............... | G01B 3/1071 224/669 |
| 4,630,376 A | 12/1986 | Pentecost | | |
| 4,760,648 A * | 8/1988 | Doak | ............... | B43K 23/04 33/668 |
| 5,172,486 A * | 12/1992 | Waldherr | ............... | B43L 9/045 33/27.03 |
| 5,477,619 A * | 12/1995 | Kearns | ............... | B25H 7/04 33/27.03 |
| 5,577,329 A * | 11/1996 | States | ............... | G01B 3/1084 33/668 |
| 6,434,854 B1 | 8/2002 | MacColl et al. | | |
| 7,086,176 B2 | 8/2006 | Lin | | |
| 8,468,710 B1 | 6/2013 | Mos | | |
| 2001/0034953 A1* | 11/2001 | Cole, III | ............... | B43L 9/04 33/668 |
| 2002/0011006 A1* | 1/2002 | Smith | ............... | G01B 3/1084 33/668 |
| 2003/0088993 A1* | 5/2003 | Baida | ............... | B25C 3/008 33/668 |
| 2005/0268480 A1* | 12/2005 | Potter | ............... | G01B 3/1056 33/768 |
| 2006/0185185 A1* | 8/2006 | Scarborough | ............... | G01B 3/1084 33/759 |
| 2007/0101600 A1* | 5/2007 | Alders | ............... | G01B 3/1084 33/760 |
| 2007/0220770 A1* | 9/2007 | Brown | ............... | G01B 3/1084 33/668 |
| 2007/0294905 A1* | 12/2007 | Whittenburg | ............... | B25H 7/04 33/760 |
| 2011/0138644 A1* | 6/2011 | Smith | ............... | G01B 3/1005 33/767 |
| 2012/0036727 A1* | 2/2012 | McCarthy | ............... | B43K 23/001 33/760 |
| 2014/0165414 A1* | 6/2014 | Smith | ............... | G01B 3/1084 33/768 |
| 2015/0354934 A1* | 12/2015 | Schneider | ............... | G01B 3/1084 33/760 |

* cited by examiner

*Primary Examiner* — G. Bradley Bennett
(74) *Attorney, Agent, or Firm* — LaMorte & Associates, P.C.

(57) ABSTRACT

A marking assembly that attaches to a surface of a tool in order to produce a mark at a point adjacent to that tool surface. A marking device is provided. A support plate is provided that supports the marking device. The support plate attaches to the tool using an attachment mechanism. The attachment mechanism can be adhesive, mechanical and/or magnetic. The marking device obscures the point where it marks during its operation. A position indicator is provided to provide the user with a visual indication of where the marking device will mark. The visual indication can be a physical indicator and/or a beam of light.

20 Claims, 9 Drawing Sheets

SYSTEM AND METHOD FOR ATTACHING A POSITION MARKER TO A TOOL

RELATED APPLICATIONS

This application claims the benefit of Provisional Patent Application No. 61/960,213 filed Sep. 12, 2013; and Provisional Patent Application No. 61/961,776 filed Oct. 23, 2013.

BACKGROUND OF THE INVENTION

1. Field of the Invention

In general, the present invention relates to devices for marking a point, or a series of points, on a surface as determined by a tape measure, stud finder, level, or similar tool. More particularly, the present invention relates to the structures that interconnect the marking device to the casing of the tool.

2. Prior Art Description

There are many hand tools that measure distance, angles, depths, and the like. When these tools are used to measure a length of a surface, the user of the tool typically marks the measurement on that surface using a pencil or similar marker. Using both a measurement tool and a pencil typically requires a handyman to use both hands. Often, both hands are not free to use. Accordingly, many hand tools have been designed over the years that contain integral marking systems. These hand tools enable a handyman to both make a measurement and a mark using one hand in most cases. Such prior art tools also eliminate the need to carry and use a separate marker, such as a pencil or pen.

One of the most common measurement tools used by construction workers and handymen is the tape measure. The tape measure is typically used for measuring lengths along a surface. In the prior art, several tape measures have been designed with markers that can mark a measurement on a surface. Such prior art marks the surface in a variety of ways. Some tape measures have ink markers or graphite pencil markers that can be pressed against a surface to make a mark. Such prior art is exemplified by U.S. Pat. No. 4,015,337 to Taylor, entitled Combined Tape Measure And Marking Device; U.S. Pat. No. 4,296,554 to Hammerstrom, entitled Tape Measure and Marking Device, and U.S. Pat. No. 6,434,854 to MacColl, entitled Integrated Marking And Tape Measure.

In the prior art, other tape measures mark using a pin that cuts an indentation into the surface being measured. Such prior art is exemplified by U.S. Pat. No. 4,630,376 to Pentecost, entitled "Marking Device For A Tape Measure". Still other tape measures contain chalk line mechanisms that utilize a chalk covered line to mark an underlying surface. Such prior art marking systems are exemplified by U.S. Pat. No. 7,086,176 to Scarbourough, entitled "Tape measure That Incorporates A Belt Type Marking Device".

Each of the prior art marking techniques have disadvantages. Prior art marking systems that use ink, pencil graphite or chalk dust are prone to smearing. This is especially true if the underlying surface is wet. Furthermore, many ink-based marking systems have a tendency to permanently mark the underlying surface. This is especially true if the ink mark is left to dry over time. Accordingly, such marking systems cannot be employed on surfaces that are to remain pristine.

Similarly, marking systems that scratch a mark cannot be used on surfaces that are intended to remain pristine. Rather, such marking systems can only be used on unfinished soft surfaces, such as construction lumber. Furthermore, marking systems that scratch marks simply cannot be used on hard surfaces such as glass, ceramic, hardened steel, granite, or very soft surfaces, such as exposed fiberglass insulation.

Prior art marking systems that rely upon pencil graphite or chalk dust need a sharp point or a sharp edged wheel in order to make physical contact between the surface being marked and the graphite or chalk dust. That is, the pencil marker must run across the surface being marked, or the chalk line must be pressed by a wheel against the surface being marked. In either scenario, surface conditions, such as the presence of water, oil, frost, sawdust or the like can prevent the marking system from working and may even clog the marking system, causing it to fail. Furthermore, the pressure of the pencil point or wheel can create indents if a soft surface is being marked.

In U.S. Pat. No. 8,468,710, the applicant invented an improved system for marking surfaces that deposits a small mark of chalk dust without the marker physically contacting the surface being marked. This system eliminates many of the stated problems associated with prior art marking systems. The current invention improves upon the applicant's previous work by presenting improvements to the chalk dust marking system and the manner in which the dust marking system can be attached to existing tools. These improvements are contained within the present invention as described and claimed below.

SUMMARY OF THE INVENTION

The present invention is a marking assembly that attaches to a surface of a tool in order to produce a mark on the surface of a solid material at a point adjacent to the tool. A marking device is provided. The marking device can produce a mark with caulk, ink, graphite or any such marking medium. The marking device creates a precise marking when manually activated. The marking device is retained within a receptacle. The marking device is selectively removed from the receptacle when the marking device needs to be refilled with marking material.

A support plate is provided that supports the receptacle and the marking device. The support plate attaches to the tool using an attachment mechanism. The attachment mechanism can be adhesive, a self-adhesive coating, mechanical and/or magnetic.

The marking device obscures the point where it marks during its operation. A position indicator is provided to provide the user with a visual indication of where the marking device will mark. The visual indication can be a physical indicator, such as a line or arrow on the support plate. Alternatively, a light source can be provided that provides a beam of light as a visual indicator.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention marking device can be affixed to many different tools, the embodiments illustrated show the marking device being used on a few exemplary tools. These exemplary embodiments are selected in order to set forth some of the best modes contemplated for the invention. The illustrated embodiments, however, are merely exemplary and should not be considered limitations when interpreting the scope of the appended claims.

Figure 1:
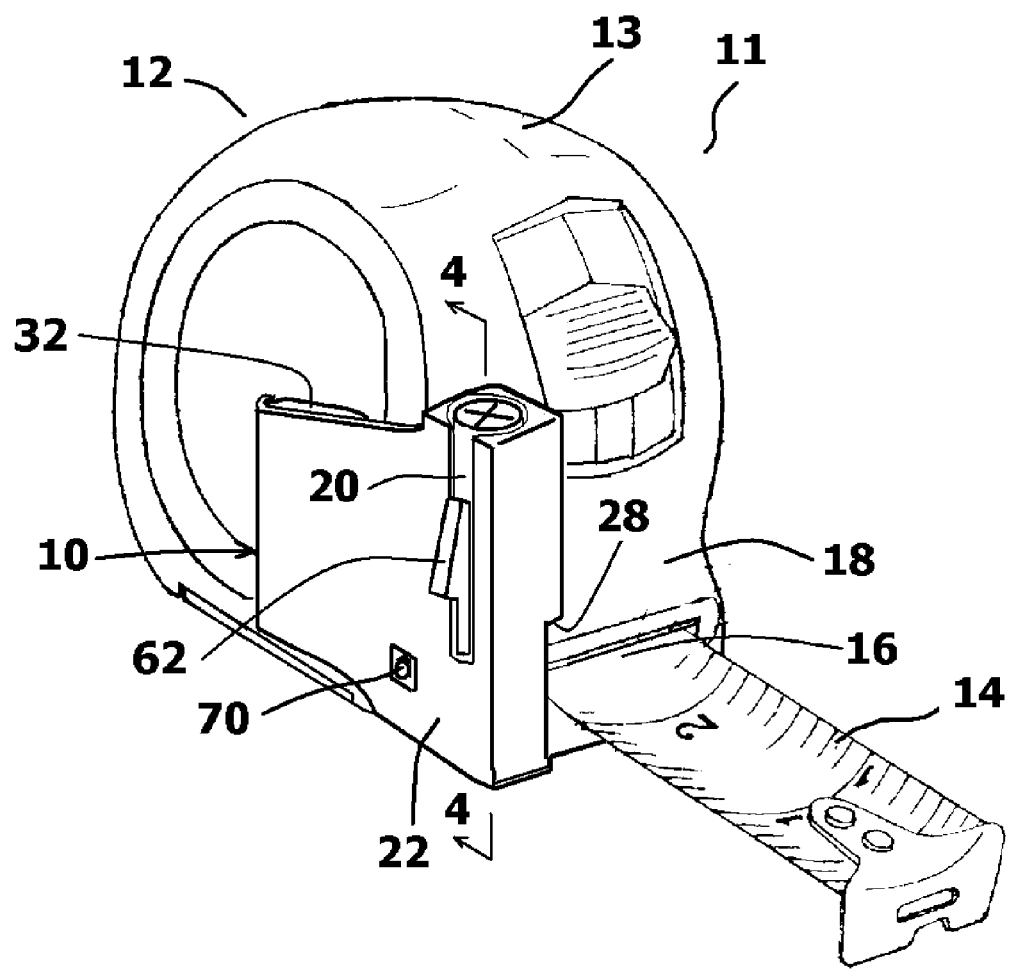
FIG. 1 is a perspective view of a first exemplary embodiment of the present invention.
Figure 2:
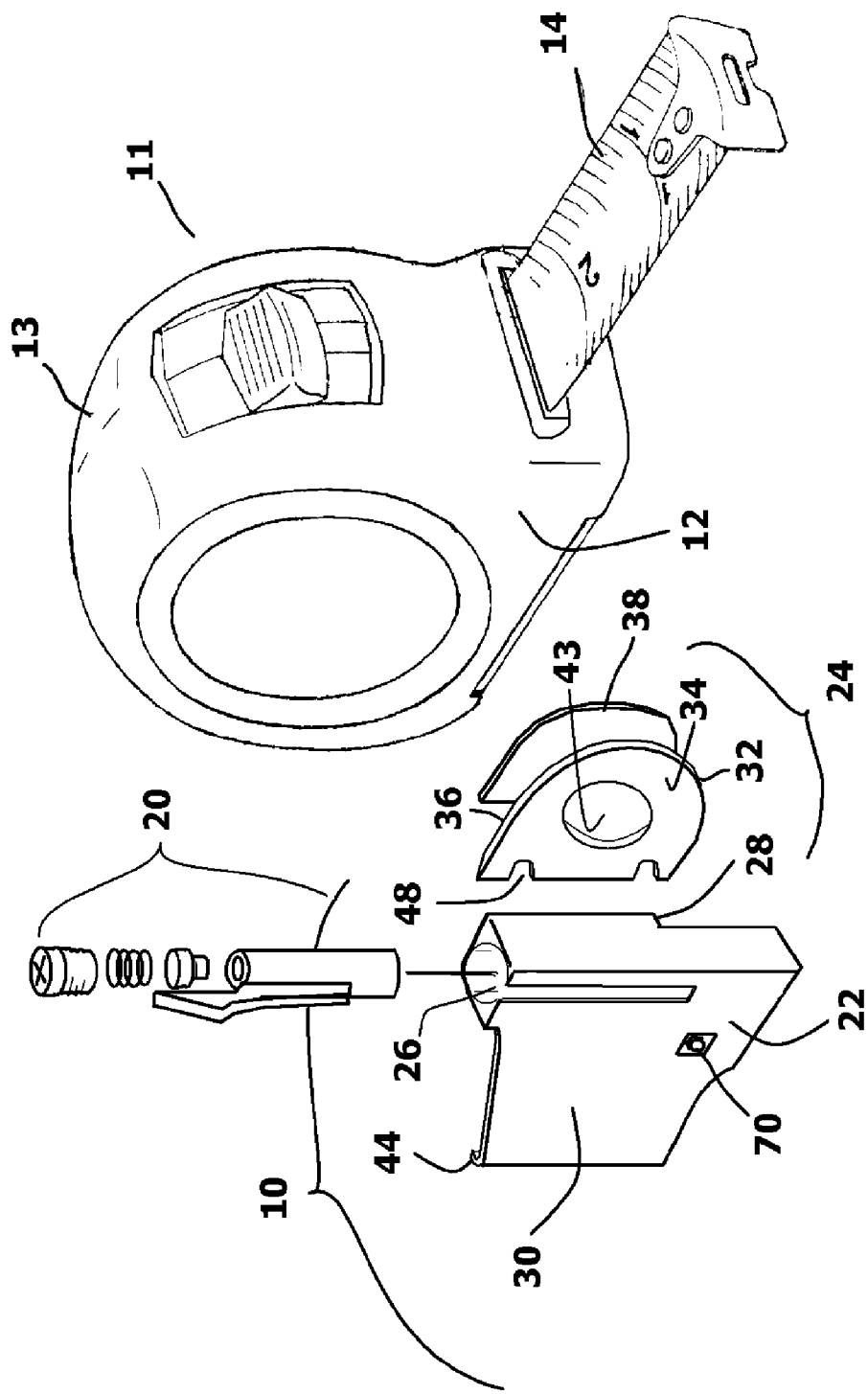
FIG. 2 is an exploded view of the exemplary embodiment of FIG. 1.

Referring in to FIG. 1 in conjunction with FIG. 2, a marking assembly 10 is shown affixed to a prior art tool 11. In the illustration, the tool 11 is a tape measure 13. However, as will be later explained, the marking assembly 10 can be applied to numerous other tools, such as stud finders, levels, angle gauges, and the like.

In the illustrated embodiment, the tape measure 13 has a casing 12 that retains a coiled delineated tape 14 in the traditional manner. The tape 14 extends from the casing 12 through a tape opening 16 on the front surface 18 of the casing 12.

In the shown embodiment, marking assembly 10 is retroactively attached to the tool 11. As such, the marking assembly 10 can be sold as an after market product. As will be explained in more detail, the marking assembly 10 is capable of producing a mark on most any surface being measured or referenced by the tool 11. In this manner, a person can measure an object and mark measurements on that object in one-step and with using only one hand without an additional marker. The mark deposited on the surface is preferably a dust mark produced by a mark dispenser 20. The structure and the operation of the mark dispenser 20 is the subject of U.S. Pat. No. 8,468,710, the disclosure of which is incorporated into this disclosure by reference. However, ink, paint, or graphite marking dispensers can also be used.

The marking assembly 10 includes a tool accessory 22 that connects to the tool 11 using an attachment mechanism 24. The mark dispenser 20 is held within a tool accessory 22 as the tool accessory 22 mounts to the tool 11 with the attachment mechanism 24.

The tool accessory 22 is a unit that contains three primary components. Those primary components include a cartridge receptacle 26 for holding the mark dispenser 20, a position indicator 28 viewable by the person using the tool 11, and a support plate 30 that attaches to the tool 11. The support plate 30 supports both the cartridge receptacle 26 and the mark dispenser 20 in functional positions.

Figure 3:
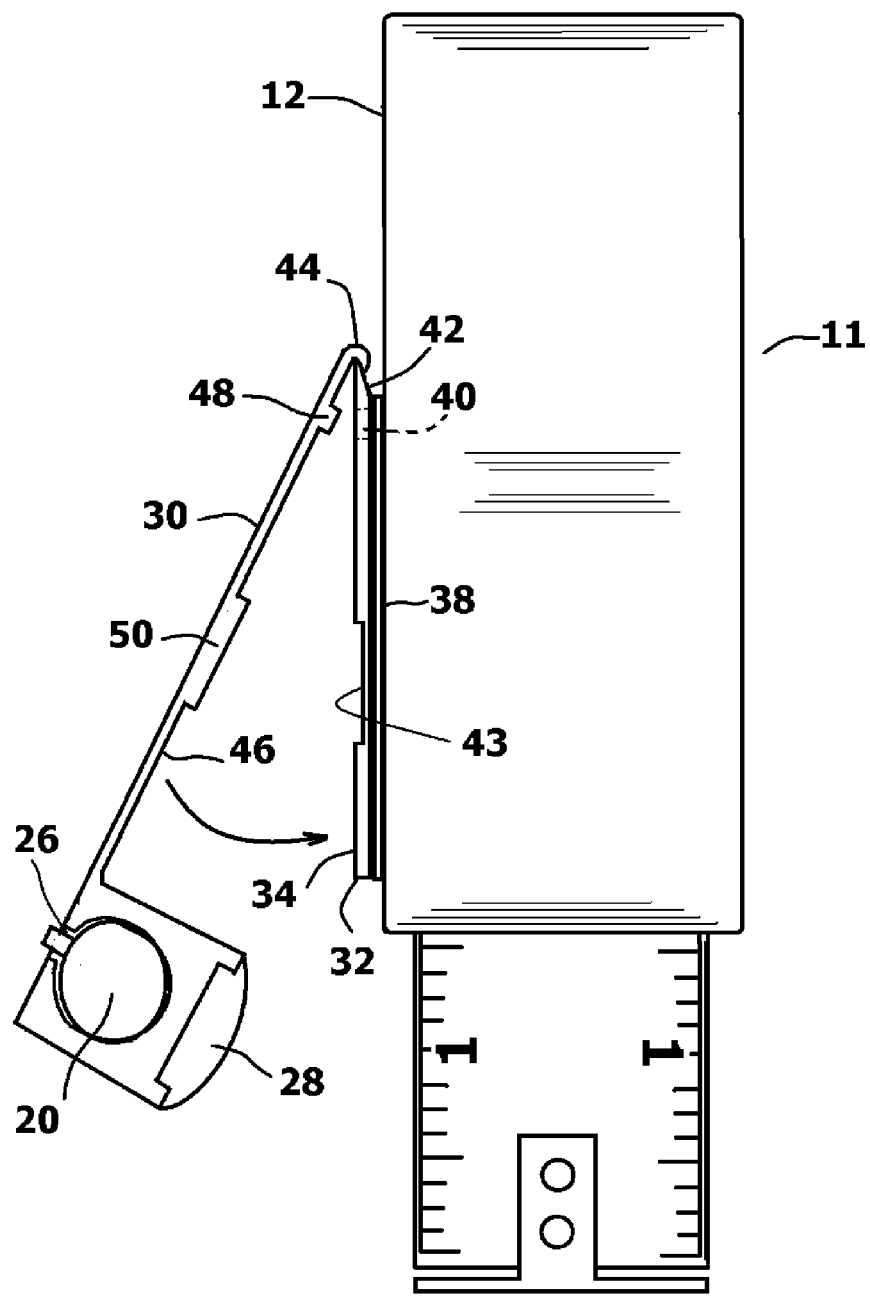
FIG. 3 is a top view showing the elements of the attachment mechanism in the first exemplary embodiment.

The attachment mechanism 24 interconnects the support plate 30 to the casing 12 of the tool 11 in a predetermined position and orientation. The attachment mechanism 24 can have many configurations. Some are shown in later embodiments. The intended purpose of the attachment mechanism 24 is to orient the tool accessory 22 so that the mark dispenser 20 and position indicator 28 can function properly with the tool 11. Referring to FIG. 3 in conjunction with FIG. 1 and FIG. 2, it can be seen that the attachment mechanism 24 includes a mounting plate 32. The mounting plate 32 has a front surface 34 and a back surface 36. The back surface 36 of the mounting plate 32 is covered in an adhesive 38 that enables the mounting plate 32 to adhere directly to the casing 12 of the tool 11.

The mounting plate 32 can be steel or can otherwise contain a piece of ferro-magnetic material. In this manner, a magnet will magnetically attach to the mounting plate 32. Furthermore, the front surface 34 of the mounting plate 32 contains one or more keyed protrusions and/or depressions 40. The mounting plate 32 also contains a reverse beveled edge 42.

The support plate 30 on the tool accessory 22 physically supports the cartridge receptacle 26 and the position indicator 28. The support plate 30 has a hooked edge 44 that is sized to engage the reversed beveled edge 42 of the mounting plate 32. The support plate 30 has an inside surface 46 that abuts against the front surface 34 of the mounting plate 32. The inside surface 46 contains protrusions and/or depressions 48 that key with the protrusions and/or depressions 40 on the front surface 34 of the mounting plate 32. Furthermore, a magnetic element 50 is affixed to the support plate 30. The magnetic element 50 causes the support plate 30 of the tool accessory 22 to magnetically attach to the mounting plate 32. The magnetic element 50 holds the support plate 30 in contact with the mounting plate 32. The interconnection between the hooked edge 44 and the reverse beveled edge 42, properly positions the support plate 30 relative the mounting plate 32. Lastly, the interconnection between the various keyed protrusions and/or depressions 40, 48 prevent the tool accessory 22 from twisting or otherwise shifting in position. The result is a support plate 30 on the tool accessory 22 that is firmly affixed to the mounting plate 32, yet can be readily pulled away from the mounting plate 32 with a user's hand.

Many variations to the attachment mechanism 24 can be made by altering the shape of the mounting plate 32, the shape of the support plate 30, the position of the magnetic element 50, the position of the hooked edge 44 and/or the positions of the various keyed protrusions and depressions 40, 48. It will be understood that the support plate 32 of the tool accessory 22 can be affixed to the casing 12 of the tool 11 by attachment means other than are shown. Different attachment means may eliminate the need for the separate mounting plate 32. The mounting plate 32 is illustrated and described to show that the tool accessory 22 is preferably removable from a tool 11. However, what is of primary importance is that the tool accessory 22 attach to the casing 12 of the tool 11 in one fixed position where it is capable of properly performing its designed functions.

Figure 4:
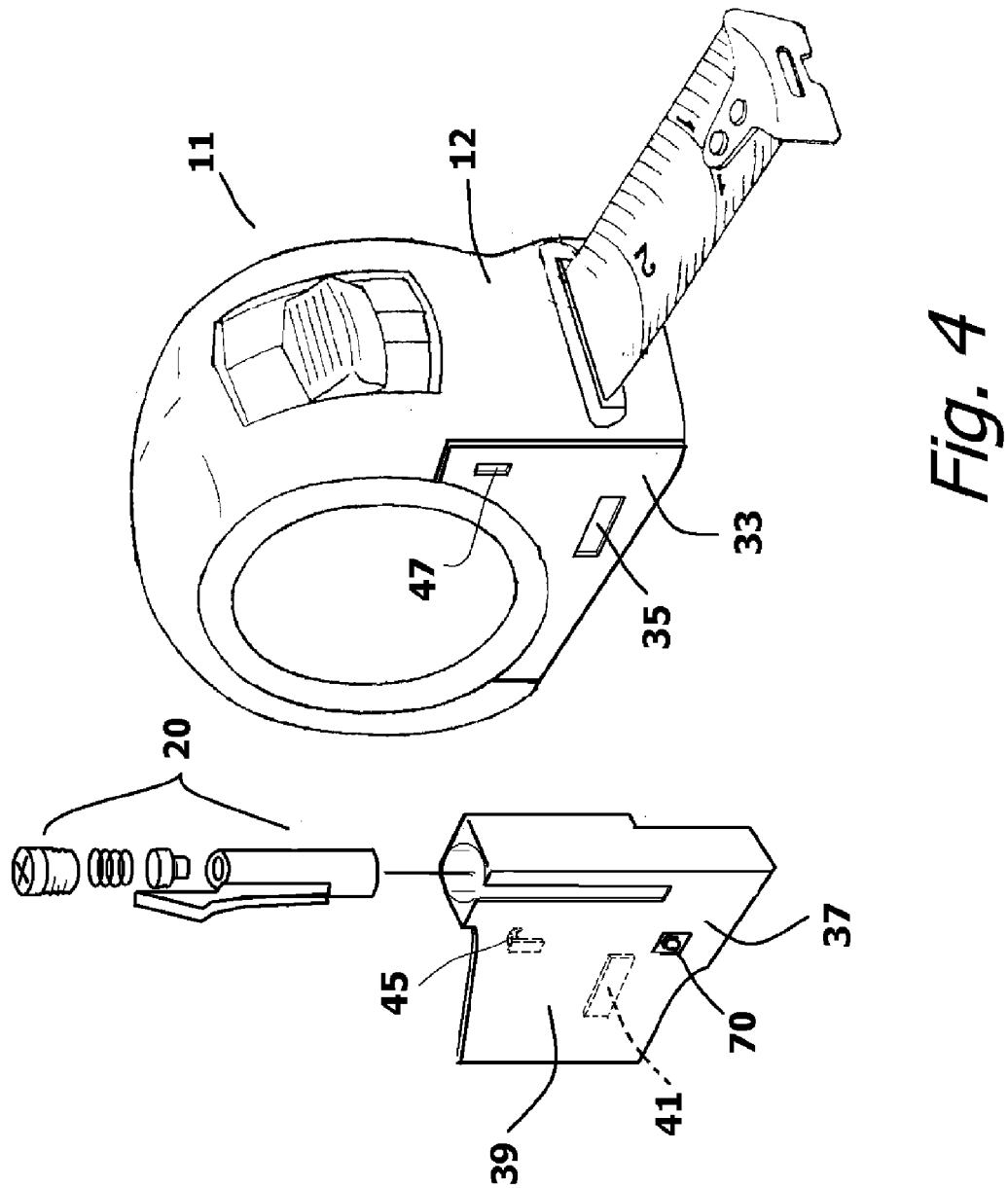
FIG. 4 is a explode view of the marking assembly showing an alternate configuration for the attachment mechanism between tool and accessory.

Referring now to FIG. 4, an alternate embodiment for the attachment mechanism is shown. In this embodiment, a mounting plate 33 is directly affixed to the casing 12 of the tool 11. The mounting plate 33 can be formed as part of the casing 12 and is therefore an element produced by the manufacturer, not a part added in retrofit. The mounting plate 33 can be ferromagnetic or contain magnetic or ferromagnetic elements that are molded into the casing 12 of the tool 11.

The tool accessory 37 contains a support plate 39. A hook 45 is disposed on the support plate 39 that engages a hole 47 on the mounting plate 33. One or more magnets 41 are affixed to the support plate 39. The magnets 41 are sized and positioned to intermesh with depressions 35 on the mounting plate 33. When the support plate 39 is placed in abutment with the mounting plate 33, the support plate 39 magnetically attracts the ferromagnetic material 43 of the mounting plate 33, causing a magnetic interconnection. Furthermore, the magnets 41 on the support plate 39 and the depressions 35 on the mounting plate 33 act as position keys to precisely position the tool accessory on the tool. It will be understood that the position of the magnets 41 and ferromagnetic material 43 can be reversed in position as a matter of design choice. That is important is that a strong connection occurs between the support plate 39 and the mounting plate 33. Although, the use of a magnetic connection is preferred, mechanical connections can be made using T-slot connections, dovetail connections of the like.

Figure 5:
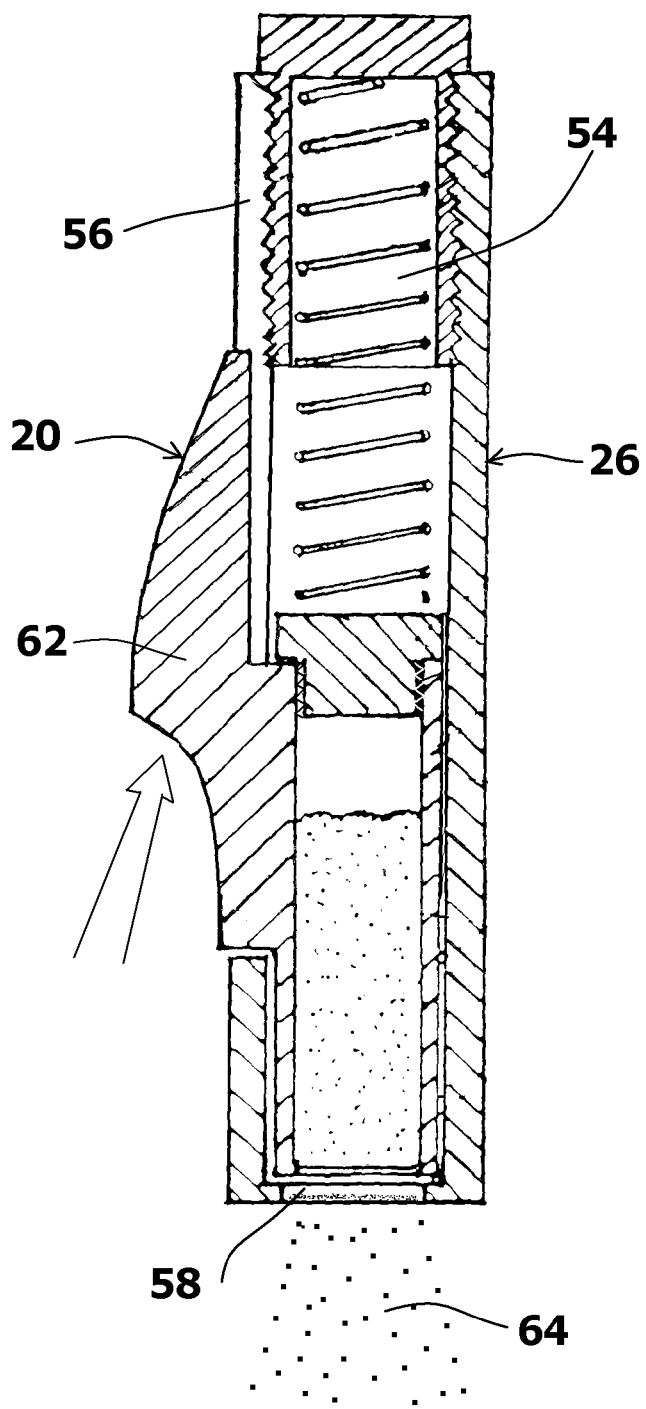
FIG. 5 is a fragmented cross-sectional view of the mark dispenser viewed along section line 4-4 of FIG. 1.

Regardless of the selected configuration of the attachment mechanism, the second primary component of the tool accessory 22 is the cartridge receptacle 26. The support plate 30 attaches to the tool 11 and positions the cartridge receptacle 26 so that the bottom of the cartridge receptacle 26 is close to the same plane as the bottom of the tool 11. Referring to FIG. 5 in conjunction with FIG. 1 and FIG. 2, it can be seen that the cartridge receptacle 26 is a chamber with an interior 54 that is sized to receive the mark dispenser 20. The interior 54 is accessible through a slotted front opening 56. A hole 58 is also formed in the bottom surface 59 of the cartridge receptacle 26. The operation of the mark dispenser 20 is fully described in U.S. Pat. No. 8,468,710, the disclosure of which has previously been incorporated into this disclosure by reference.

The mark dispenser 20 is inserted into the cartridge receptacle 26 through the top of the cartridge receptacle 26. The mark dispenser 20 has a spring loaded tab 62. When the tab 62 is lifted and released, the mark dispenser 20 ejects marking material 64 from its bottom end. The marking material 64 travels through the hole 58 in the bottom surface 59 of the cartridge receptacle 26 and marks the surface immediately below the cartridge receptacle 26. Since the bottom of the cartridge receptacle 26 is held close to the bottom of the tool 11, the mark dispenser 20 marks the surface below the tool 11 when activated. The mark is deposited a predetermined distance from the casing 12 of the tool 11.

Figure 6:
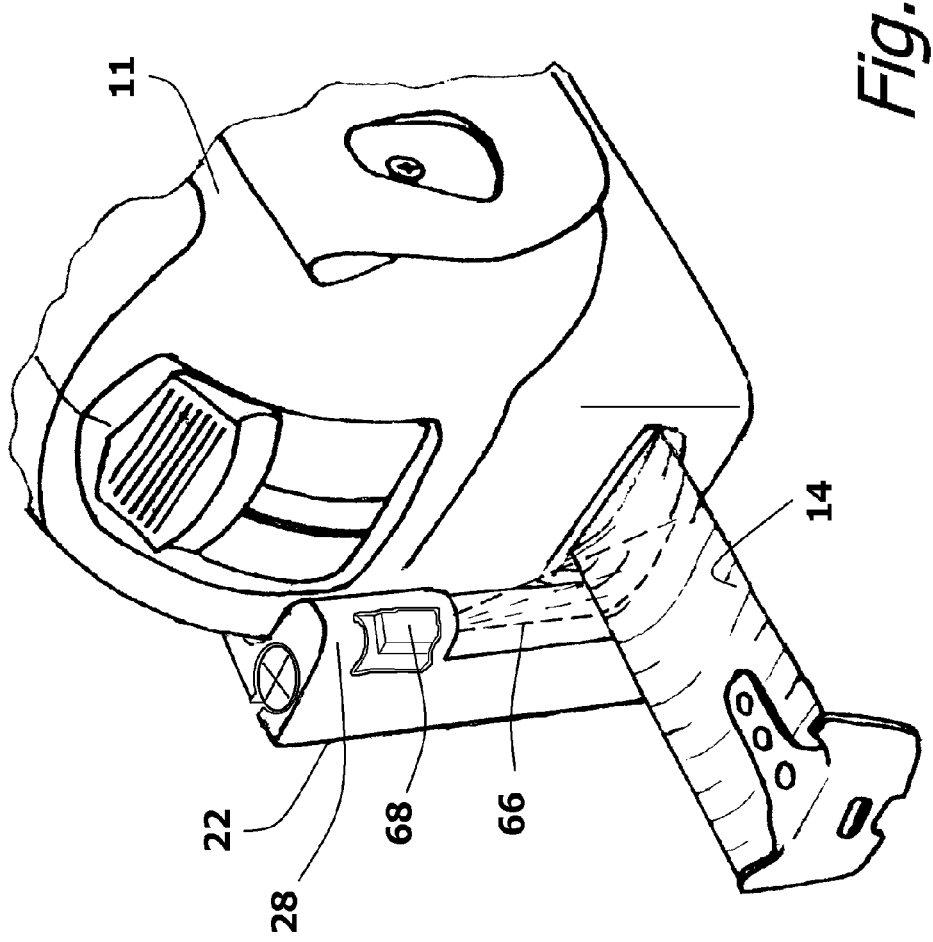
FIG. 6 is a fragmented perspective view showing a laser based functioning of the position indicator.

The third major component of the tool accessory 22 is the position indicator 28. The purpose of the position indicator 28 is to inform the user of the tool 11 exactly where the mark dispenser 20 is going to deposit its mark, even though that point cannot be directly observed while using the tool 11. Referring to FIG. 6, in conjunction with FIG. 1 and FIG. 2, it can be seen that the position indicator 28 can produce a light beam 66 that shines in front of the tool 11 in the same plane as the mark deposited by the mark dispenser 20. If the tool 11 is a tape measure, as is illustrated, the light beam shines upon the numbered tape 14. A person can therefore use the tool accessory 22 to mark precise measurements.

The light beam 66 can be a laser beam, a collimated light beam from LEDs, or a focused light beam of LEDs. The light source 68 and batteries are contained within the structure of the tool accessory 22. The activation switch 70 for controlling the light source 68 is preferably near the mark dispenser 20. In this manner, a person can activate the light source 68 with one finger and then activate the mark dispenser 20 with an adjacent finger.

Figure 7:
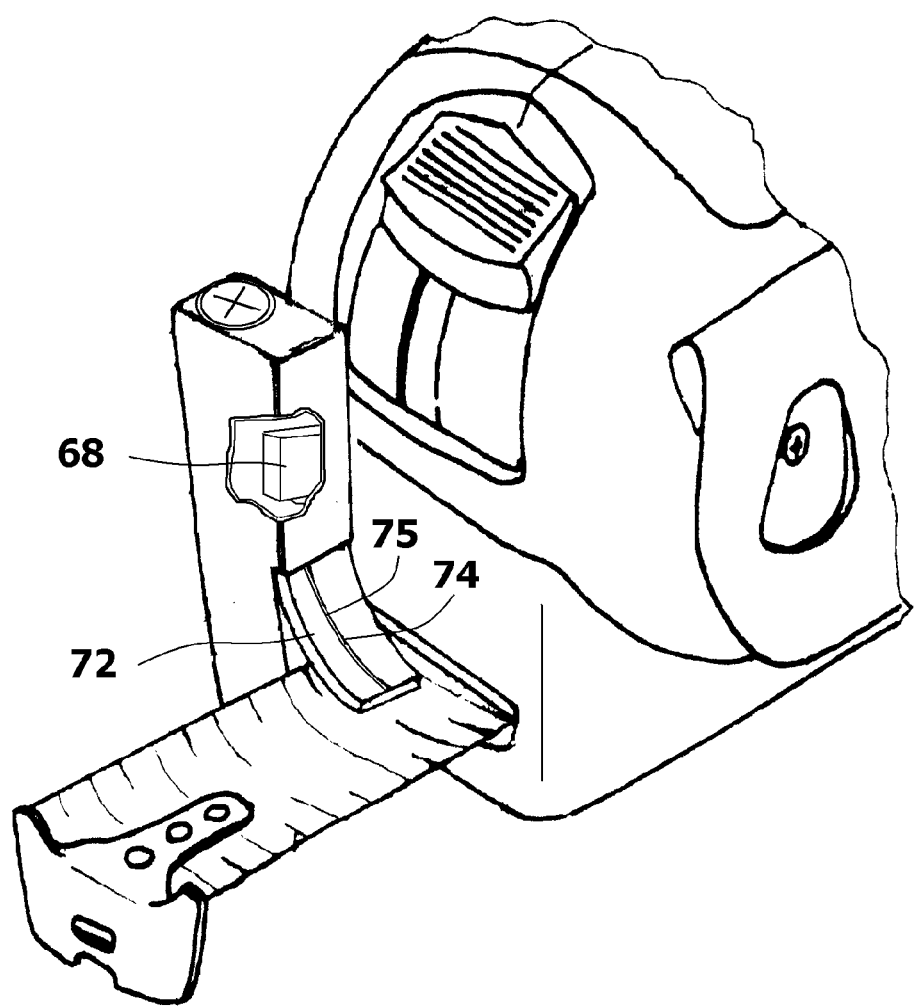
FIG. 7 is a fragmented perspective view showing an LED based functioning of an alternate embodiment of the position indicator.

The use of a light source 68 to generate a light beam 66 is only one way that light can be used in the position indicator 28. Referring to FIG. 7, it can be seen that a light source 68 can also be used to illuminate a transparent tab 72. A groove 74 can be formed into the transparent tab 72. When the transparent tab 72 is internally illuminated, the groove 74 becomes highly visible and appears to glow as it diffracts the passing light. A user can therefore use the groove 74 as a reference to take measurements. A line 75 can also be formed onto the transparent tab 72 next to the groove 74. The line 75 runs parallel to the groove 74. The line 75 is visible in normal lighting conditions when the internal illumination of the transparent tab 72 is not used. The user can also use the line 75 as a reference to take measurements. The mark dispenser 20 can then be activated to create markings at those measurements. In the embodiment of FIG. 7, the transparent tab 72 is curved. It should be understood that the transparent tab can be straight and need not curve out over the tape 14. What is important is that the line 74 be visible in reference to the marks of the tape 14.

In the embodiments of FIGS. 1-7, the marking assembly is shown affixed to a tape measure. It will be understood that the marking assembly need not be part of a tape measure, but rather can operate on its own or as part of another measuring, detecting, or imprinting tool.

Figure 8:
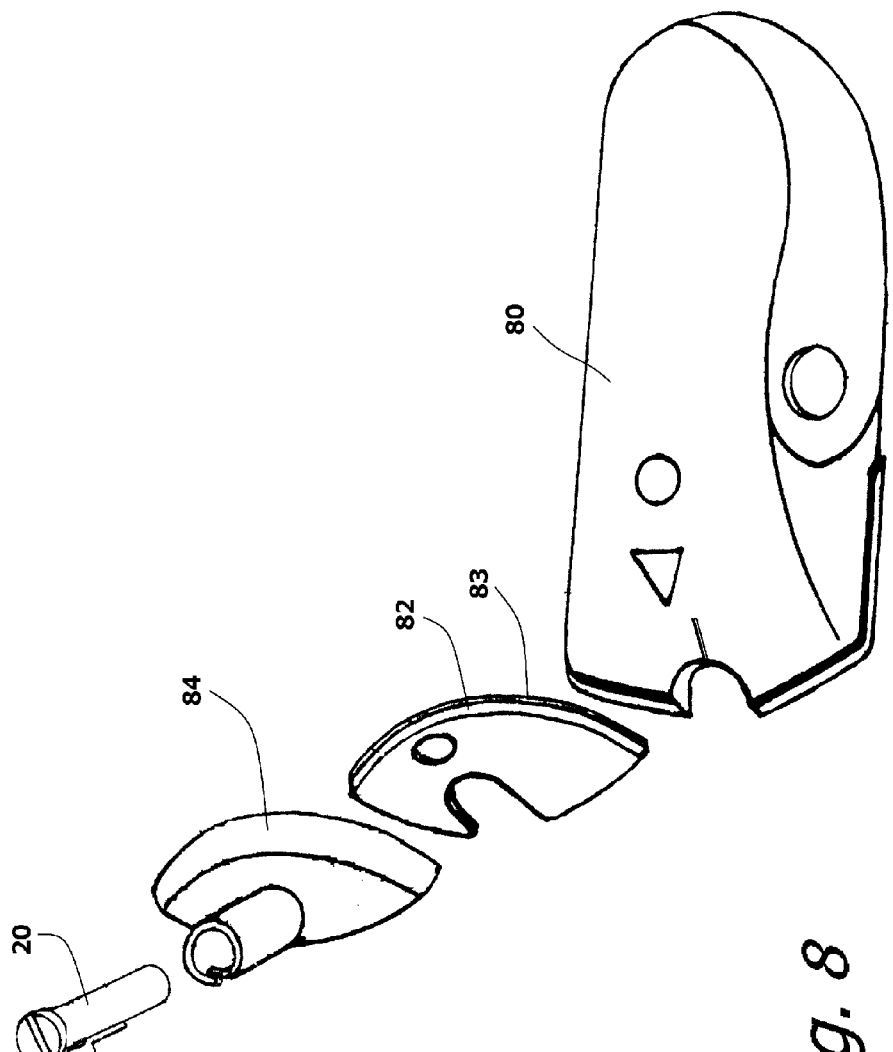
FIG. 8 is an exploded view of a second exemplary embodiment of the present invention being applied to a stud finder.

Referring to FIG. 8, such an alternate embodiment is shown. In this embodiment, the tool 80 is a stud finder. A mounting plate 82 is provided that attaches to the tool 80 using a press-on pad of adhesive 83. Alternatively, the mounting plate 82 can be manufactured as part of the tool casing. A tool accessory 84 is provided that attaches to the mounting plate 82 in the same manner as was explained in the earlier embodiment. The tool accessory 84 supports a mark dispenser 20 that can mark a surface in the positions that the stud finder locates studs.

Figure 9:
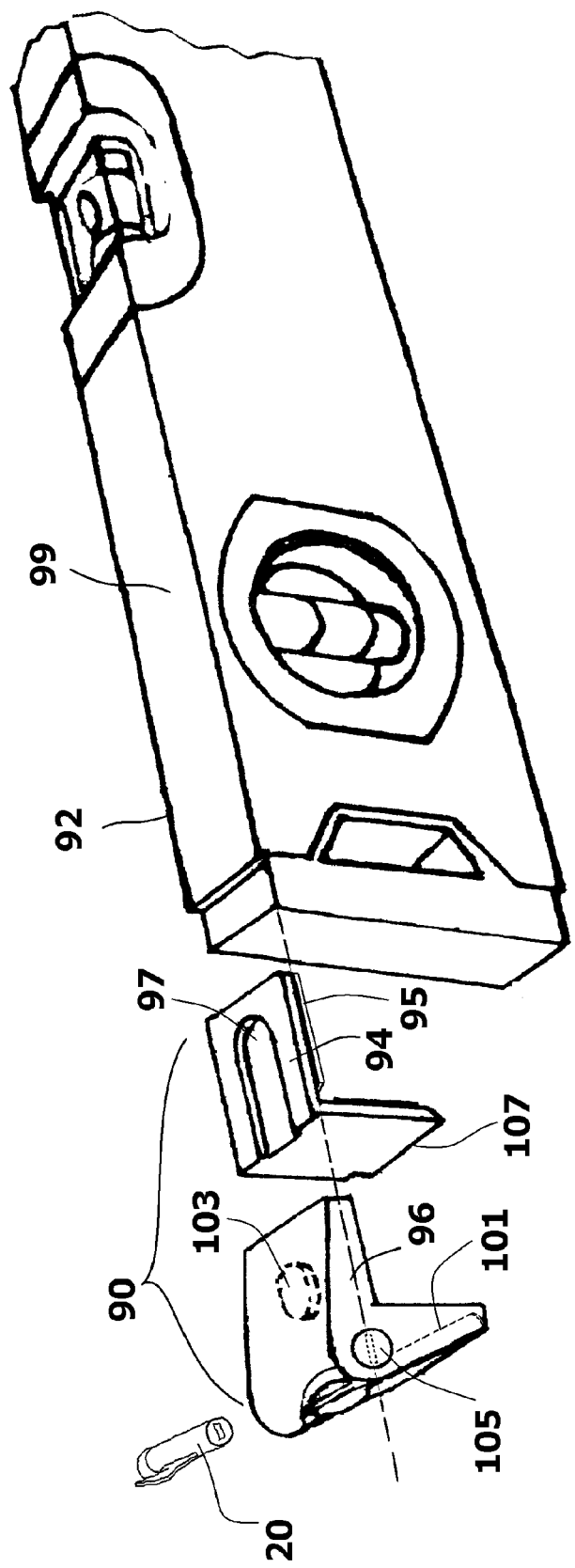
FIG. 9 is an exploded view of a third exemplary embodiment of the present invention being applied to a level.

Referring lastly to FIG. 9, an alternate embodiment is shown where a marking assembly 90 is applied to a carpenter's level 92. The marking assembly 90 includes a mounting plate 94 that attaches to the level 92 with press-on tab of adhesive 95. The mounting plate 94 contains ferromagnetic material 97. Furthermore, the mounting plate 94 presents a reversed bevel edge 107.

A tool accessory 96 attaches to the mounting plate 94 using a mechanical and magnetic attachment mechanism. The tool accessory 96 contains a hooked edge 101 that mechanically engages the reversed bevel edge 107. The tool accessory 96 also contains a magnet 103 that magnetically connects to the ferromagnetic material 97 on the mounting plate 94. The tool accessory supports a mark dispenser 20. It will be understood that the positions of the magnet 103 and the ferromagnetic material 97 can be reversed as a matter of design choice.

A cartridge receptacle 105 is formed into the tool accessory 96. The cartridge receptacle 105 holds a mark dispenser 20. When the mark dispenser 20 is activated, it marks a point that is in line with the top edge 99 of the level 92.

In all embodiments, a tool accessory mounts to a tool. The tool accessory contains a mark dispenser that can mark a surface adjacent the tool while using the tool. Accordingly, it will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. A marking assembly that attaches to a surface of a tool for selectively producing a mark at a point adjacent said surface, said assembly comprising:
   a mark dispenser that produces a mark when activated;
   a cartridge receptacle that receives and retains said mark dispenser;
   a support plate that supports said cartridge receptacle and said mark dispenser;
   an attachment mechanism for attaching said support plate to said surface of said tool, wherein said support plate orients said cartridge receptacle and said mark dispenser proximate said point.

2. The assembly according to claim 1, wherein said attachment mechanism includes a mounting plate that attaches to said surface of said tool, wherein said support plate selectively attaches to said mounting plate.

3. The assembly according to claim 2, wherein said support plate selectively attaches to said mounting plate with a magnetic connection.

4. The assembly according to claim 3, wherein said support plate further selectively attaches to said mounting plate with a mechanical connection.

5. The assembly according to claim 4, wherein said mechanical connection includes a hooked connection.

6. The assembly according to claim 4, wherein said mechanical connection includes protrusions and depressions between said mounting plate and said support plate that engage and orient said support plate upon said mounting plate.

7. The assembly according to claim 1, further including a position indicator positioned adjacent said cartridge receptacle.

8. The assembly according to claim 7, wherein said position indicator produces a visual indication of where said mark dispenser will mark prior to said mark dispenser being activated.

9. The assembly according to claim 8, wherein said visual indication is a beam of light.

10. The assembly according to claim 8, further including an actuator for activating a light source that produces said beam of light.

11. The assembly according to claim 9, wherein said beam of light internally illuminates a transparent tab and said visual indication is a feature on said transparent tab, wherein said feature is selected from a group consisting of grooves and lines.

12. A marking assembly that attaches to a surface of a tool for selectively producing a mark at a point adjacent said surface, said assembly comprising:
   a marking device that produces a mark when activated;
   a support for supporting said marking device;
   an attachment mechanism for attaching said support to said surface of said tool, wherein said support orients said marking device proximate said point; and
   a position indicator that provides a visual indication of said point.

13. The assembly according to claim 12, wherein said position indicator is coupled to said support.

14. The assembly according to claim 12, wherein said attachment mechanism includes adhesive that adheres said support to said surface of said tool.

15. The assembly according to claim 12, wherein said attachment mechanism includes a mounting plate that attaches to said surface of said tool, wherein said support selectively attaches to said mounting plate.

16. The assembly according to claim 15, wherein said support selectively attaches to said mounting plate with a magnetic connection.

17. The assembly according to claim 16, wherein said support further selectively attaches to said mounting plate with a mechanical connection.

18. The assembly according to claim 12, wherein said visual indication is a beam of light.

19. The assembly according to claim 12, wherein said visual line is line disposed in a transparent element.

20. The assembly according to claim 13, further including a receptacle for selectively holding said marking device, wherein said receptacle is coupled to said support.

* * * * *